United States Patent
Mo et al.

(10) Patent No.: US 9,652,457 B2
(45) Date of Patent: May 16, 2017

(54) USE OF DISCOVERY TO UNDERSTAND USER BEHAVIOR, INTERESTS AND PREFERENCES

(75) Inventors: Stanley Mo, Portland, OR (US); Claudio J. Ochoa, Villa Allende (AR); Gustavo D. Domingo Yaguez, Córdoba (AR); Shannon R. Schroeder, Hillsboro, OR (US); Victor Szilagyi, London (GB); Elliott Smith, Birmingham (GB)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 13/997,174

(22) PCT Filed: Dec. 13, 2011

(86) PCT No.: PCT/US2011/064616
§ 371 (c)(1),
(2), (4) Date: May 12, 2014

(87) PCT Pub. No.: WO2013/039539
PCT Pub. Date: Mar. 21, 2013

(65) Prior Publication Data
US 2014/0244662 A1  Aug. 28, 2014

Related U.S. Application Data
(60) Provisional application No. 61/533,457, filed on Sep. 12, 2011.

(51) Int. Cl.
*G06F 17/30* (2006.01)

(52) U.S. Cl.
CPC .. *G06F 17/30017* (2013.01); *G06F 17/30867* (2013.01)

(58) Field of Classification Search
CPC ............... G06F 17/30867; G06F 17/30017
(Continued)

(56) References Cited

U.S. PATENT DOCUMENTS 8,015,580 B2 *  9/2011  Poling, Jr. .......... H04N 5/44543
                                                          725/39
8,527,493 B1 *  9/2013  Hamatake ......... G06F 17/30864
                                                          707/707
(Continued)

FOREIGN PATENT DOCUMENTS

JP    2010-061600 A    3/2010
JP    2011-061668 A    3/2011
(Continued)

OTHER PUBLICATIONS

International Preliminary Report on Patentability and Written Opinion received for PCT Patent Application No. PCT/US2011/064616, mailed on Mar. 20, 2014, 7 pages.
(Continued)

*Primary Examiner* — Shahid Alam
(74) *Attorney, Agent, or Firm* — Jordan IP Law, LLC

(57) ABSTRACT

Methods and systems may involve identifying source content associated with an activity of a user with respect to a first media source. Discovery content may be captured from one or more additional media sources based on the source content, wherein the discovery content may be presented to the user if at least a portion of the discovery content is tangential to the source content.

8 Claims, 2 Drawing Sheets

(58) Field of Classification Search
USPC .............................. 707/748; 709/203; 702/1
See application file for complete search history.

(56) References Cited

U.S. PATENT DOCUMENTS

| | | | |
|---|---|---|---|
| 2003/0105589 A1 | 6/2003 | Liu et al. | |
| 2005/0234877 A1* | 10/2005 | Yu | G06F 7/00 707/669 |
| 2006/0252412 A1* | 11/2006 | Yamato | H04W 92/02 455/412.1 |
| 2007/0022072 A1* | 1/2007 | Kao | G06F 17/30719 706/45 |
| 2007/0219985 A1 | 9/2007 | Aravamudan et al. | |
| 2008/0109415 A1 | 5/2008 | Yabe et al. | |
| 2008/0127281 A1* | 5/2008 | Van Flandern | H04N 7/17318 725/87 |
| 2008/0204595 A1* | 8/2008 | Rathod | G06F 17/30796 707/669 |
| 2009/0070408 A1 | 3/2009 | White | |
| 2009/0158346 A1 | 6/2009 | Zer et al. | |
| 2011/0113051 A1 | 5/2011 | Lindahl et al. | |

FOREIGN PATENT DOCUMENTS

| TW | 200820019 A | 5/2008 |
|---|---|---|
| WO | 2013/039539 A1 | 3/2013 |

OTHER PUBLICATIONS

Office Action received for Japanese Patent Application No. 2014-529698, mailed Nov. 10, 2015, 2 pages including 1 page of English translation.

Office Action received for Japanese Patent Application No. 2014-529698, mailed Jan. 19, 2016, 3 pages including 1 page of English translation.

European Search Report for EP Patent Application No. 11872203.2, dated May 4, 2015, 10 pages.

Office Action for Japanese Patent Application No. 2014-529698, dated Mar. 17, 2015, 4 pages. Includes 3 pages of English translation.

International Search Report and Written Opinion received for PCT application No. PCT/US2011/064616, mailed on Jul. 9, 2012, 10 pages.

Office Action and Search Report received for Chinese Patent Application No. 201180073407.1, mailed Dec. 3, 2015, 23 pages including 14 pages of English translation.

Chinese Office Action for Chinese Patent Application No. 201180073407.1, mailed Aug. 5, 2016, 25 pages including 14 pages of English translation.

* cited by examiner

USE OF DISCOVERY TO UNDERSTAND USER BEHAVIOR, INTERESTS AND PREFERENCES

CROSS-REFERENCE TO RELATED APPLICATIONS

The present application claims the benefit of priority to U.S. Provisional Patent Application No. 61/533,457 filed Sep. 12, 2011.

BACKGROUND

Traditional search engines may select search results based on keywords or topics entered by a user in an effort to direct the user to a specific end goal. Such a strategy may not be the most effective in understanding the user's behavior, interests and preferences.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
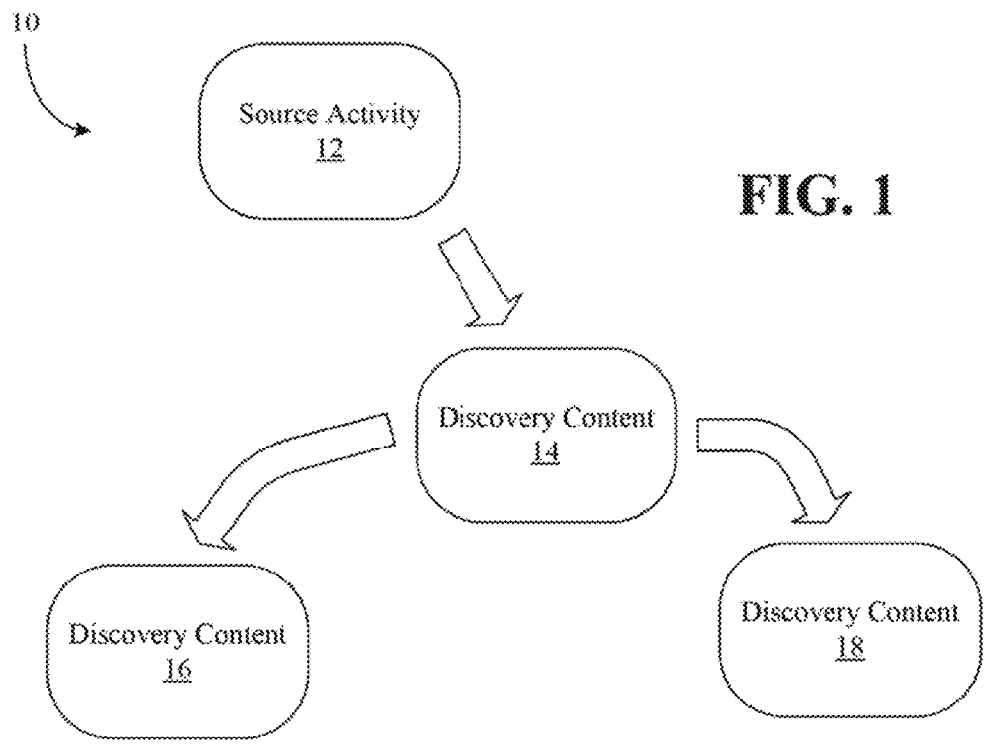
FIG. 1 is a block diagram of an example of a scheme of identifying discovery content according to an embodiment.

Embodiments may include at least one computer accessible storage medium having a set of instructions which, if executed by a processor, cause a computer to identify source content associated with an activity of a user with respect to a first media source. The instructions may also cause a computer to capture discovery content from one or inure additional media sources based on the source content, and present the discovery content to the user if at least a portion of the discovery content is tangential to the source content.

Embodiments may also include a computing platform having a display device a source module configured to identify source content associated with an activity of a user with respect to a first media source. The platform may also include a discovery module to capture discovery content from one or more additional media sources based on the source content, and it presentation module to present the discovery content to the user via the display device if at least a portion of the discovery content is tangential to the source content.

Other embodiments may include an apparatus having logic configured to identify source content associated with an activity of a user with respect to a first media source, and capture discovery content from one or more additional media sources based on the source content. The logic may also present the discovery content to the user if at least a portion of the discovery content is tangential to the source content.

In addition, embodiments may include at least one computer accessible storage medium having a set of instructions which, if executed by a processor, cause a computer to identify source content associated with an activity of a user with respect to as first media source. The source content may include one or more of metadata, one or more keywords, music lyrics, closed captioned information, subtitle information, video information and audio information. The instructions may also cause a computer to capture discovery content from one or more additional media sources based on the source content, and present the discovery content to the user if at least a portion of the discovery content is tangential to the source content. Additionally, the instructions may cause a computer to detect one or more user selections from the discovery content, and identify one or more differentials between the source content and the discovery content based on the one or more user selections. Moreover, the instructions may cause a computer to determine whether the one or more differentials are dependent on whether the user is associated with a group of people during the activity, and determine whether the one or more differentials are media platform dependent. The instructions may also cause a computer to create a weighted dataset based on the source content, the discovery content, the one or more user selections, the one or more differentials, and the one or more macro content areas.

Additionally, embodiments may involve a computer implemented method in which source content associated with an activity of a user is identified with respect to a first media source, wherein the source content includes one or inure of metadata, one or more keywords, music lyrics, closed captioned information, subtitle information, video information and audio information. The method may also provide for capturing discovery content from one or more additional media sources based on the source content, presenting the discovery content to the user if at least a portion of the discovery content is tangential to the source content, and detecting one or more user selections from the discovery content. In addition, the method may include identifying one or more differentials between the source content and the discovery content based on the one or more user selections, and identifying one or more macro content areas based on the source content, the discovery content, the one or more user selections, and the one or more differentials. Moreover, the method may involve determining whether the one or more differentials are dependent on whether the user is associated with a group of people during the activity, determining whether the one or more differentials are media platform dependent, and creating a weighted dataset based on the source content, the discovery content, the one or more user selections, the one or more differentials, and the one or more macro content areas.

Turning now to FIG. 1, a scheme 10 of identifying discovery content is shown, in general, a source activity 12 of a user/consumer may be identified, wherein the source activity 12 may include, for example, watching television (TV), listening to music, reading a book, and so forth. One or more topics and/or keywords may be drawn/extracted from the source activity 12. The topics/keywords may be Web-based, locally tagged, metadata enabled, etc. For example, music lyrics, audio and e-book text tracks, ambient video or audio information, embedded text such as closed captioning information or subtitles, or any other relevant metadata may all be extracted from the source activity 12.

In the illustrated example, the source activity 12 is used to capture discovery content 14 from one or more additional media sources. The discovery content 14 may be presented to the user, wherein the user may select from the discovery content 14, which may lead to the identification of further discovery content 16, 18. For example, if while the user is watching a show on the US Navy, the term "Hawaii" is encountered as a closed captioned or subtitled word. Hawaii may be used to identify and capture content from a wide variety of sources. Many types of Hawaii-related content (e.g., photos, recipes, music, architecture, the People of Hawaii and people's biographies, outriggers, social networking messages, products, etc.) may be presented to the user. In such an example, none of the presented content may be military related at all, or some of it may be, depending upon the web-sources provided or web-services the user selects as source points. Thus, at least a portion of the discovery content 14, 16, 18 may be tangential to the content extracted from the source activity 12 by design.

For example, the user's selections from the presented discovery content can branch into many areas of interest, new areas of interest or old ones. In this fashion, as the user's interests change and evolve or develop, they are not only identified, but they are used to actively present the user with opportunities to grow and learn or experience new things. Accordingly, the illustrated approach is less of a historical view of the user's past interests, and more of a representation of a path forward and a mechanism of proactively determining and directing what areas of interest the particular use is trending towards.

Ultimately, such an understanding of the individual user as opposed to an aggregated consensus created by searching), provides another facet of information about the user based on areas of interest, which may have relationships to other areas of interest. The illustrated approach may also provide a proactive mechanism of presenting interesting things to the user in order to delight, entertain and surprise the user. Indeed, these bits of interesting content may create interest in the user and spur demand for more related content in that area. Simply put, the illustrated scheme 10 may represent a randomness of exploration, and an expansion of interest and ideas based on serendipity, which not only may reinforce known interests, but may also identify or create new interests on the end-user side.

In particular, the responses of the user may be captured into a dataset that is associatively linked based on the source activity 12 and/or content, the resulting end-user selected discovery content 14, 16, 18, and subsequent user actions. The dataset may be used to compare and associate multiple events and their outcomes on the same or different platforms at different times/days. Such an approach create a weighted dataset that comprehends the user's interests and predilections based on various contexts.

The illustrated approach may also highlight new areas of interest which have been introduced to the user dining the discovery process. Accordingly, a greater understanding may be achieved of the user's trends, new things that the user has discovered and likes (representing new opportunities). Indeed, the discovery content 14, 16, 18, may highlight a direction in which the user is actually headed with respect to macro areas of interest. For instance, "exploration" may be identified as a trend based on linked differentials with Hawaii, New Guinea, New Zealand, Galapagos Islands across observations of the user's discovered interests when watching different types of historical documentaries, shopping and cooking shows.

Of particular note regarding the Hawaii example is that a typical search engine may simply return the most popular or demographically relevant Hawaii-related items from one or more cloud servers. In the discovery system described herein, however, the user may be presented with non-linear content (e.g., discovery items that are not directly related to the principal experience, such as TV watching). Thus, a determination could be made that the user is less interested in Hawaii and more interested in isolated, tropical islands and exploration. Moreover, the discovery approach may not rely on an aggregation of information into statistically large datasets in a cloud (although this is an option). Rather, the data may be personalized to the individual in an undiluted form. As a result, the overall precision of the user data may be specific to each user as each platform can its own user context and preference information.

In addition, the illustrated scheme 10 may be extended to a broader discovery framework in which discovery data is tracked for multiple users in the same household or for connected friends who interact with one another and may be watching or sharing in the same primary experience. Simply put, the illustrated scheme 10 may enable an understanding of how preferences and choices may change in a group setting (e.g., as family versus when the user is engaged alone).

Figure 2:
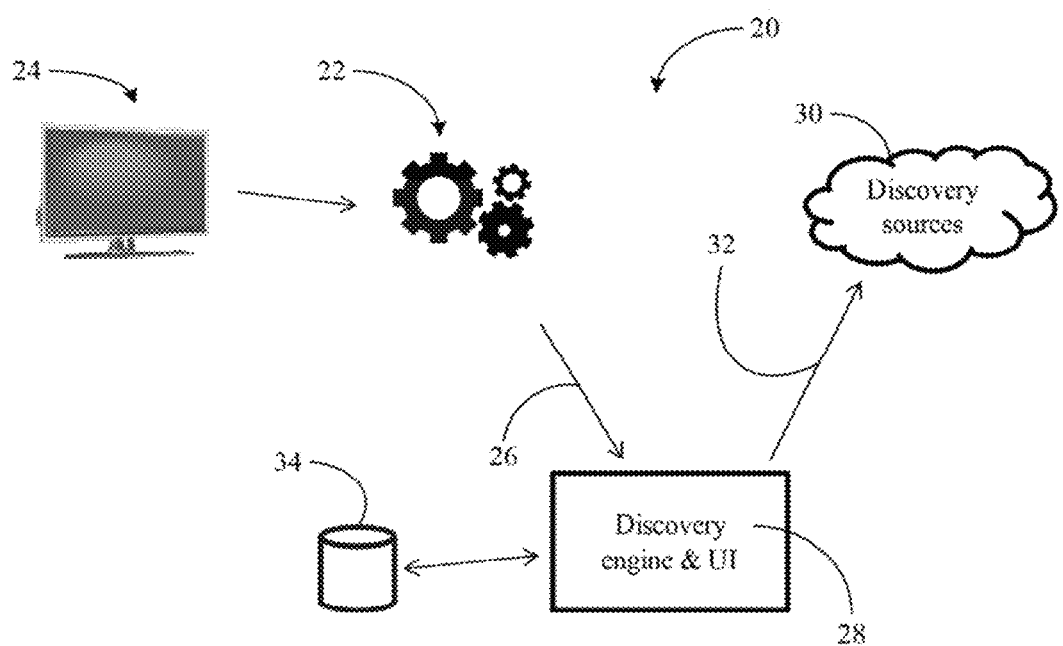
FIG. 2 is a block diagram of an example of a discovery architecture according to an embodiment.

FIG. 2 shows an architecture 20 in which an extractor 22 is used to identify metadata (e.g., tags, keywords, etc.) 26 based on a user activity with regard to a device and/or media source such as a TV 24. In the illustrated example, the metadata 26 is fed into a discovery engine 28, which identities one or more additional media discovery sources 30 and issues queries 32 to those sources 30 for discovery content such as the discovery content 14, 16, 18 (FIG. 1), already discussed. The discover content obtained from the sources 30 may be presented to the user via a user interface (UI) of the discovery engine 28 or other suitable interface, wherein a weighted dataset 34 may be created and maintained based on the user's interests and predilections in various contexts.

For example, although a conventional search engine may use parameters typed by the user into a text field to find a "correct" answer, the illustrated architecture 20 neither relies upon a user accessible entry field nor searches for a final result. Instead, the illustrated architecture 20 uses the person's activities/experiences (e.g., what they are dotty, what is entertaining or educating them, which web-services they select, etc.) as input. This input may be used to capture discovery data, wherein the discovery data may highlight their general areas of interest. The discovery data may also be used to generate additional modifiers and coefficients, which may be used to tune the targeted content to the end-user's specific interests. In addition, the discovery data may enable the identification of new areas to present to the end-user in the future.

The concepts reflected in the illustrated architecture 20 may therefore be considered as a "primary experience", a "discovery experience", "differentials", and "macros". The primary experience may be characterized as the user's main locus such as, for example, watching TV, listening to music or reading a book or e-book. The discovery experience, on the other hand, may be viewed as an experience that can be encountered/conducted on the same or a different platform and that may introduce new and tangential content to the user in order to determine if the user is open to new and interesting content (and of what type).

Differentials may also be identified in the sense that the discovery content selected by the user may represent an expansion of the primary experience either as a trigger to some interest or as part of a larger macro that provides a broader framework to link individual interests of the end-user. Such a differential may expand the user's interests from multiple primary experiences (e.g., TV and ebooks) and associations that result from the user acting autonomously or with a group of people, wherein those actions may affect the interests and decisions of others in selecting discovery content of interest.

As already noted, macros may constitute larger content spheres that help to consolidate individual choices. For instance, a selection of multiple geographic locations, types of products and activities can be "macro'd" into an "adventure" sphere that helps identify the type of user and how aggressive the discovery content can be with respect to expanding further outside the band of the primary experiences' topic.

Figure 3:
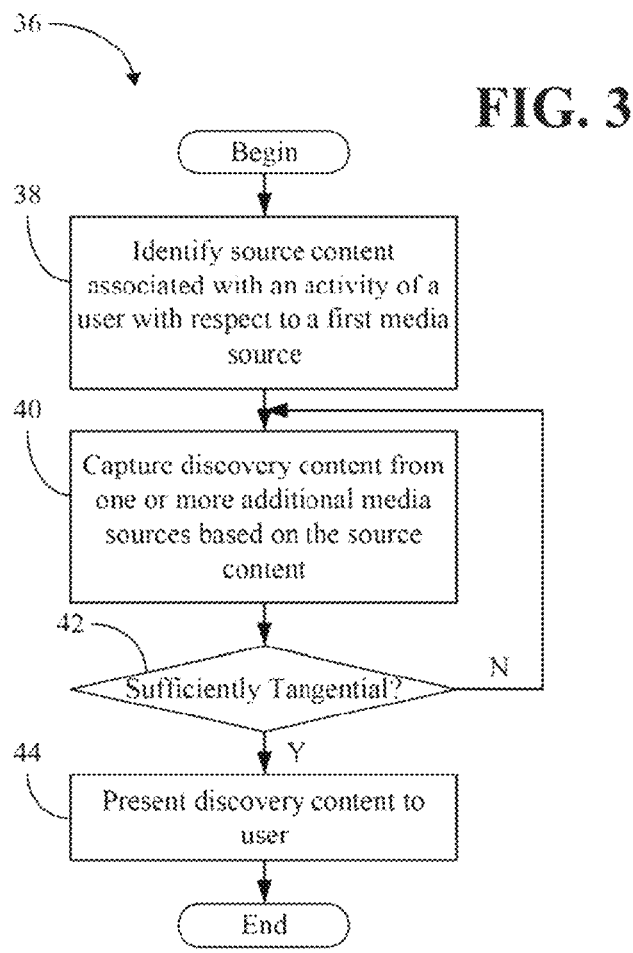
FIG. 3 is a flowchart of an example of a method of identifying discovery content according to an embodiment.

Turning now to FIG. 3, a method 36 of identifying discovery content is shown. The illustrated method 36, may be implemented, for example, as a set of executable logic instructions stored in a machine- or computer-readable storage medium such as, for example, random access memory (RAM), read only memory (ROM), programmable ROM (PROM), flash memory, firmware, microcode, etc., in fixed-functionality hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 36 may be written in any combination of one or more programming languages, including, for example, an object oriented programming language such as C++ or the like and conventional procedural programming languages, such as the "C" programming language or similar programming languages. Moreover, various aspects of the illustrated functionality may be implemented as embedded logic of a processor using any of the aforementioned circuit technologies.

Illustrated processing block 38 provides for identifying source content associated with an activity of a user with respect to a first media source. As already noted, the activity may involve watching video programming, listening to audio content, reading, and so forth. Discovery content may be captured from one or more additional media sources at block 40 based on the source content, wherein illustrated block 12 determines whether at least a portion of the discovery content is sufficiently tangential (e.g., satisfies a "tangentiality threshold") with respect to the source content. If not, the capture of discovery content may be repeated. Otherwise, the discovery content may be presented to the user at block 44.

Figure 4:
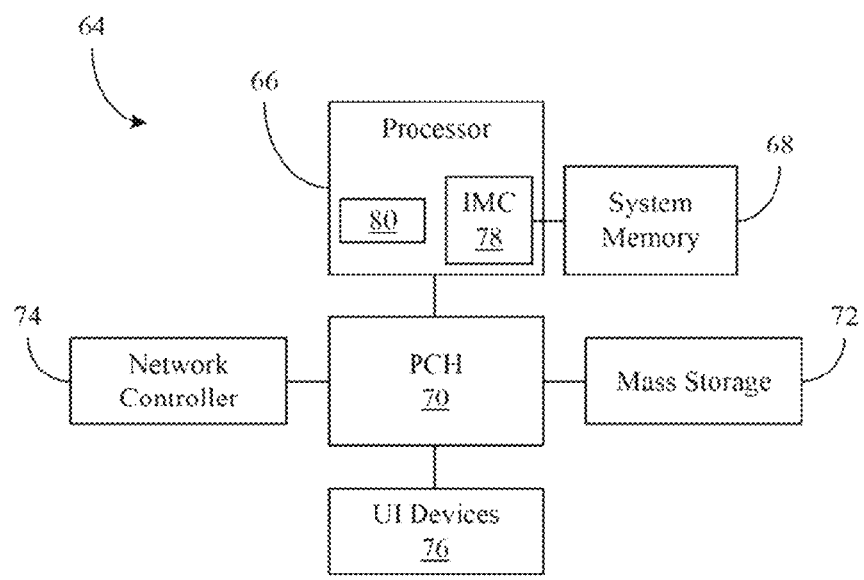
FIG. 4 is a block diagram of an example of a computing platform according to an embodiment.

FIG. 4 shows a computing platform 64 having is processor 66, system memory 68, a platform controller hub (PCH) 70, mass storage (e.g., hard disk drive/HDD, optical disk, flash memory, etc.) 72, a network interface/controller 74, one or more user interface (UI) devices 76 and various other controllers (not shown). The platform 64 may be part of, for example, a laptop, personal digital assistant (PDA), wireless smart phone, media player, imaging device, mobile Internet device (MID), any smart device such as a smart phone, smart tablet, and so forth, or any combination thereof. In addition, the platform 64 may be pan of as smart TV, personal computer (PC), server, workstation, etc. Thus, the processor 66 may include one or more processor cores capable of executing a set of stored logic instructions, and an integrated memory controller (IMC) 78 configured to communicate with the system memory 68. The system memory 68 may include, for example, dynamic random access memory (DRAM) configured as a memory module such as, for example, a dual inline memory module (DIMM), a small outline DIMM (SODIMM), etc.

In the illustrated example, the processor 66 is configured to execute logic 80 that identifies source content associated with an activity of a user with respect to as first media source, capture discovery content from one or more additional media sources based on the source content, and present the discovery content to the user via the UI devices 76 if at least a portion of the discovery content is tangential to the source content. Thus, for example, the logic 80 may include a source module, discovery module and/or presentation module configured to implement one or more aspects of the method 36 (FIG. 3), already discussed.

The illustrated PCH 70, sometimes referred to as a Southbridge of a chipset, functions as a host device and may communicate with the network controller 74, which could provide off-platform wireless communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LR-WPAN (Low-Rate Wireless Personal Area Network, e.g., IEEE 802.15.4-2006), Bluetooth (e.g., IEEE 802.15.1-2005, Wireless Personal Area Networks), WiMax (e.g., IEEE 802.16-2004, LAN/MAN Broadband Wireless LANS), GPS (Global Positioning System), spread spectrum (e.g., 900 MHz), and other RF (radio frequency) telephony purposes.

The network controller 74 may also provide off-platform wired communication (e.g., RS-232 (Electronic Industries Alliance/EIA), Ethernet (e.g., IEEE 802.3-2005), power line communication X10, IEEE P1675), USB (e.g., Universal Serial Bus. e.g., USB Specification 3.0, Rev, 1.0, Nov. 12, 2008. USB implementers Forum), DSL (digital subscriber line), cable modem, T1 connection, etc., functionality. In one example, the platform 64 uses the network controller 74 to obtain the source content from another device such as the TV 24 (FIG. 2), already discussed. The UI (e.g., touch screen, liquid crystal display/LCD, light emitting diode/LED, keyboard, mouse, etc.) devices 76 may be capable of enabling a user to interact with and perceive information from the platform 64.

Thus, as an extension or parallel to searching, techniques described herein may be proactive rather than reactive. In fact, a nominal percentage of the discovery content presented may be intentionally designated as tangential to the core topic based on the use of keywords and metadata reflecting the real-time experience of the user at that moment in the primary experience. Because the selected discovery content may be presented and tracked when the user is alone or with others, differences in behavior and what they tend to be interested in may be identified under those different conditions.

Moreover, associative discovery linking between the primary experience and the discovered content selection process may be used to achieve a better understanding of the user. In addition, the results of multiple primary experiences may be used to determine weighted preferences of discovery topics, openness to new content based on type of primary experience, what platform is being used and whether the user is alone or with friends or family.

Certain aspects of embodiments of the present invention may be implemented using hardware, software, or a combination thereof and may be implemented in one or more computer systems or other processing systems. Program code may be applied to the data entered using an input device to perform the functions described and to generate output information. The output information may be applied to one or more output devices. One of ordinary skill in the art may appreciate that embodiments may be practiced with various computer system configurations, including multiprocessor systems, minicomputers, mainframe computers, and the like. Embodiments may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that was include at least one machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" may accordingly include, but not be limited to, solid-state memories, optical and magnetic disks, and a carrier wave that encodes a data signal. Furthermore, it is common in the art to speak of software, in one form or another (e.g., program, procedure, process, is application, module, logic, and so on) as taking an action or causing a result. Such expressions are merely a shorthand way of stating the execution of the software by a processing system to cause the processor to perform an action or produce a result.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion and carry no particular temporal or chronological significance unless otherwise indicated.

While various embodiments of the present invention have been described above, it should be understood that they have been presented by way of example only, and not limitation. It will be understood by those skilled in the art that various changes in tarns and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:

1. At least one non-transitory computer accessible storage medium comprising a set of instructions which, when executed by a processor, cause a computer to:
   identify source content associated with an activity of a user with respect to a first media source, wherein the source content is to include one or more of metadata, one or more keywords, music lyrics, closed captioned information, subtitle information, video information and audio information;
   capture discovery content from one or more additional media sources based on the source content;
   present the discovery content to the user if at least a portion of the discovery content is tangential to the source content;
   detect one or more user selections from the discovery content;
   identify one or more differentials between the source content and the discovery content based on the one or more user selections;
   identify one or more macro content areas based on the source content, the discovery content, the one or more user selections, and the one or more differentials;
   determine whether the one or more differentials are dependent on whether the user is associated with a group of people during the activity;
   determine whether the one or more differentials are media platform dependent; and
   create a weighted dataset based on the source content, the discovery content, the one or more user selections, the one or more differentials, and the one or more macro content areas.

2. The at least one non-transitory computer accessible storage medium of claim 1, wherein the activity is to include watching television.

3. The at least one non-transitory computer accessible storage medium of claim 1, wherein the activity is to include listening to music.

4. The at least one non-transitory computer accessible storage medium of claim 1, wherein the activity is to include reading a book.

5. A computer implemented method comprising:
   identifying source content associated with an activity of a user with respect to a first media source, wherein the source content includes one or more of metadata, one or more keywords, music lyrics, closed captioned information, subtitle information, video information and audio information;
   capturing discovery content from one or more additional media sources based on the source content;
   presenting the discovery content to the user if at least a portion of the discovery content is tangential to the source content;
   detecting one or more user selections from the discovery content;
   identifying one or more differentials between the source content and the discovery content based on the one or more user selections;
   identifying one or more macro content areas based on the source content, the discovery content, the one or more user selections, and the one or more differentials;
   determining whether the one or more differentials are dependent on whether the user is associated with a group of people during the activity;
   determining whether the one or more differentials are media platform dependent; and
   creating a weighted dataset based on the source content, the discovery content, the one or more user selections, the one or more differentials, and the one or more macro content areas.

6. The method of claim 5, wherein the activity includes watching television.

7. The method of claim 5, wherein the activity includes listening to music.

8. The method of claim 5, wherein the activity includes reading a book.

* * * * *